Dec. 19, 1944.  R. W. SHAFOR  2,365,221
APPARATUS AND METHOD FOR CONDUCTING IONIC EXCHANGE OPERATIONS
Filed Feb. 28, 1942  7 Sheets-Sheet 1

INVENTOR
RALPH W. SHAFOR
BY
ATTORNEY

INVENTOR
RALPH W. SHAFOR
BY
ATTORNEY

Dec. 19, 1944.    R. W. SHAFOR    2,365,221
APPARATUS AND METHOD FOR CONDUCTING IONIC EXCHANGE OPERATIONS
Filed Feb. 28, 1942    7 Sheets-Sheet 4

INVENTOR
RALPH W. SHAFOR
BY
ATTORNEY

Dec. 19, 1944. R. W. SHAFOR 2,365,221
APPARATUS AND METHOD FOR CONDUCTING IONIC EXCHANGE OPERATIONS
Filed Feb. 28, 1942 7 Sheets—Sheet 5

INVENTOR
RALPH W. SHAFOR
BY
ATTORNEY

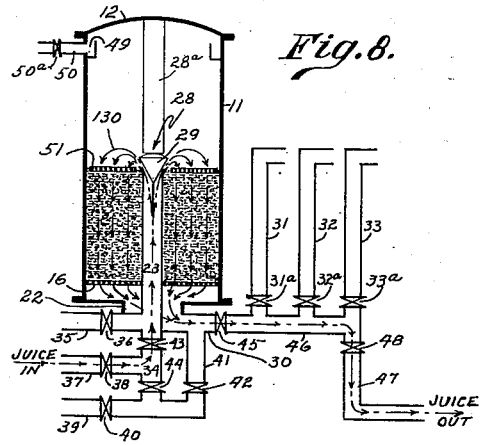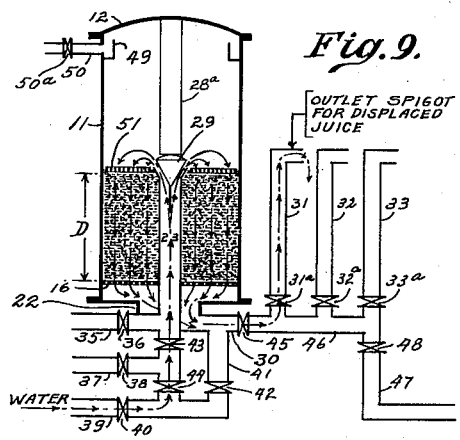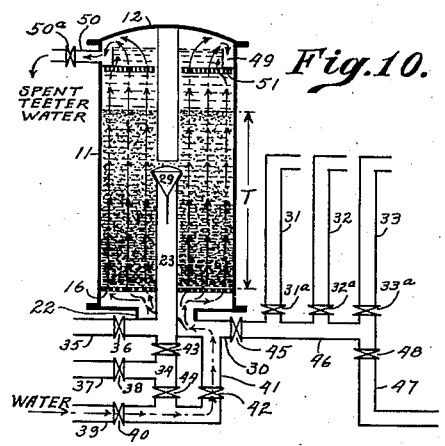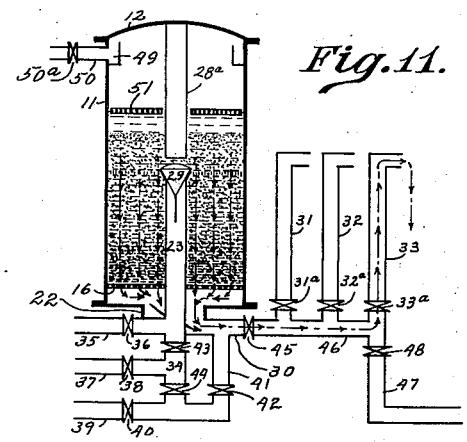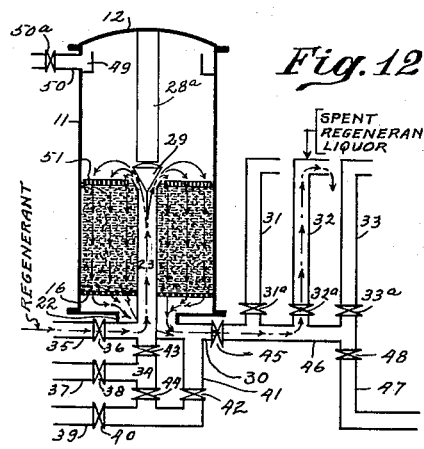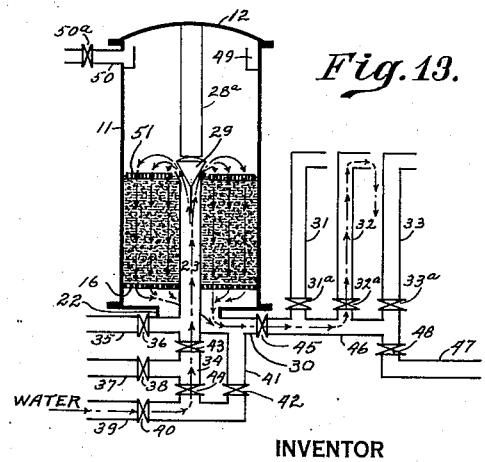
INVENTOR
RALPH W. SHAFOR
BY
ATTORNEY Patented Dec. 19, 1944

2,365,221

UNITED STATES PATENT OFFICE 2,365,221

APPARATUS AND METHOD FOR CONDUCTING IONIC EXCHANGE OPERATIONS

Ralph W. Shafor, New York, N. Y., assignor to The Dorr Company, Inc., New York, N. Y., a corporation of Delaware Application February 28, 1942, Serial No. 432,898

20 Claims. (Cl. 210—24)

This invention relates to the treatment of solutions by means of ionic exchangers. More specifically, this relates to improvements in method and apparatus for conducting the operating cycle of a bed or a series of beds of exchanger material.

An ionic exchanger is usually represented in the form of a unit or cell containing a bed of the exchanger material proper which is usually granular. An exchanger has the ability to take up from the solution an ion of an ionized solute and to give off into the solution in exchange an ion of another kind of like electric charge. Therefore, cation exchangers as a class exchange positively charged ions, whereas anion exchangers as a class exchange negatively charged ions.

As the solution is passed through and contacted with the ion exchanger bed, the direct exchange of respective ions between the solution and the exchanger continues until the exchanger is saturated with absorbed ions to be removed and its exchange capacity thus exhausted. The exchange capacity can then be restored by treatment of the exchanger with a suitable regenerant solution. The saturation on the one hand, and the regeneration on the other hand, represent the main phases of the operating cycle of an exchanger, whereby the exchanger may be used over and over again. The chemical reactions involved in the operating cycle are reversible equilibrium reactions.

While this invention is broadly applicable to the ionic exchange treatment of solutions in general, it has features of particular importance for the purification treatment of sugar juices, whereby ionic impurities or dissolved salts are subtracted from the juice, the presence of which impurities otherwise would prevent a certain amount of sucrose from crystallizing and thus cause its loss in the form of molasses. Therefore, although in no limiting sense, the invention will hereinafter be described with reference to the treatment of sugar juices.

That is to say, recent developments in the purification of sugar juice are bases upon the removal of ionic impurities or salts from the juice by way of ionic exchange treatment and by means of granular exchanger materials of organic nature. These exchanger materials are known as organolites in distinction from the so-called zeolites which are inorganic and the use of which is known and established in water purification treatment for which various types of industrial apparatus have been evolved. A practical operating cycle in the purification of sugar juice by means of organolites may comprise:

1. Passing the juice to be treated through a fresh exchanger bed in submergence until the bed has become saturated.
2. Displacing the residual juice downwardly from the bed by means of wash water.
3. Washing upward to displace solid phase impurities from the bed.
4. Passing regenerant solution downwardly through the bed in submergence, until the bed has become regenerated.
5. Displacing the residual regenerant solution downwardly from the bed by means of wash water, whereupon the bed is ready for a new cycle.

It is to be noted that the organolites are substantially stable in the presence of acids or alkalies, whereas the zeolites are not. This quality of the organolites is important because in the exchange treatment of the sugar juice both an acid and alkaline phase or environment are being encountered due to the particular exchange mechanism involved (and hereinafter described). Zeolites on the other hand, are unstable unless they operate in a substantially neutral medium, as in the practice of water purification treatment. Another differentiating factor never encountered in water treatment, is that sugar solutions or juices carry a solute (namely, sucrose) of value that involves side reactions, such as inversion of the sucrose, as the sucrose tends to deteriorate into invert sugars when unduly detained in an acid environment. That is to say, under such conditions a quantity of sucrose that is potentially crystallizable, will turn into inert sugar that is non-crystallizable and as such constitutes a loss in the form of molasses.

It is one of the aspects of this invention that this coincidental chemical reaction of inversion be minimized, by minimizing the time of detention of the juice in the exchanger bed, while in its acid phase.

The objects of this invention are concerned with increasing the effectiveness and the efficiency of the operating cycle of exchanger beds. This includes (a) efficient utilization of the exchange capacity proper of the exchanger material in the bed, and (b) the economic handling of the solutions or liquids being contacted with the bed, and (c) expediting the performance of the operating cycle of an exchanger cell.

One problem is how to maintain the exchanger bed free of deposits or solid phase impurities such as may either coat or envelope the exchanger particles or may accumulate in the interstices or voids between the particles of the bed. For instance, sugar juice to be treated by the exchanger may carry such matter or else substances which are adapted to form precipitates. Such solid phase impurities may lodge in the interstices of the exchanger bed or may attach themselves to the granules. A quantity of solid phase impurities may be in the form of precipitates resulting from the reactions accompanying the exchange operation.

Hence it is one object to maintain the exchanger bed free and well-washed of solid phase impurities, the presence of which would reduce the effectiveness and the efficiency of the exchange function of the exchanger bed.

Another object pertaining to the maintenance of efficient operation of the exchanger bed is that the entire volume or capacity of the bed be uniformly and effectively utilized in the exchange operation. Therefore, besides being well-washed and freed of various kinds of solid phase impurities or deposits, the exchanger bed should be kept as of uniform depth and of uniform flow resistance throughout its area, and should be uniformly permeable with respect to the liquid or solution being passed therethrough in a downward flow. It should be understood that solutions undergoing ionic exchange in the exchanger bed should be passed downwardly therethrough for the sake of intimate and effective contact with the exchanger material, and while the bed occupies a minimum volume.

Objects of maintaining high efficiency, as above defined, of the exchanger bed, are attained by passing through the bed an evenly distributed upward flow of wash liquid in such a manner that substantially the entire range of sizes of the particles constituting the bed is placed in a sustained condition of suspension. This is usually known, and herein termed, as a teeter condition or true teeter condition. This requires a uniformly distributed and uniform upward flow of certain intensity of liquid through the bed, with the result that the depth of the bed expands until all the particles of the bed are in equilibrium with the up-flowing wash liquid. In that condition the particles range themselves in strata according to size with the coarsest at the bottom and the finest at the top. At the same time the particles being in some sort of an unstable equilibrium although suspended, constantly migrate around each other in the various zones or strata. This not only flushes out the loose matter between the particles, but it also produces a certain amount of gentle contacting between the particles, whereby solid phase impurities or precipitates that are clinging to the particles are effectively loosened up and carried away by the upward flow of the wash liquid, to be withdrawn at the top of the exchanger cell. When the upflow is stopped, the particles in teeter settle down or subside and come to rest in strata according to sizes, with the coarsest at the bottom and the finest at the top.

Consequently, the cell construction according to this invention provides for a predeterminable amount of extra cell space of free board above the top strata of the settled bed, to allow for the expansion of the exchanger bed when in teeter as above described. The free board also includes an upper margin or extra depth of liquid above the top strata of the teeter bed, to insure that no particles from the top are carried away with the spent teeter liquid that is being withdrawn at the top of the cell.

The provision of the extra cell space or free board above the settled exchanger bed for the purpose of teeter washing, and requirements regarding the economical and expeditious performance of the operating cycle as a whole, involve a further problem, namely, that of maintaining a suitable liquid or solution level in the cell. That is to say, the liquid level should not be allowed to fall to a point where it exposes any portion of the exchanger material, nor should it rise sufficiently to accumulate any appreciable amount of liquid or solution above the exchanger bed, while there is a downward flow through the bed. By preventing an undue drop of the liquid level and thus preventing exposure of the bed, air is prevented from getting locked in the voids of the bed and from increasing the flow resistance of the bed, and also from reducing the effectiveness and exchange capacity of the bed. Accumulation of a volume of excess liquid or solution above the bed may be the cause of a reduction in total operating efficiency of the operating cycle of the bed. Accumulation of excess liquid or solution above the exchanger bed may mean any one of the following objectionable conditions: that sugar juice accumulates above the bed while in its acid phase, which is the same as saying that its detention time in the acid phase is increased with the accompanying deteriorating effects due to inversion, that a corresponding excessive amount of water is needed for downward displacement of the juice, and that, moreover, the juice becomes unnecessarily diluted; or it may mean that an undesirable excess volume of regenerant solution builds up above the bed, again requiring a corresponding excess of wash water for downward displacement and at the same time effecting undesired dilution of the regenerant solution.

Taking sugar juice for example, undue fluctuations of the liquid level in the exchanger cell may be due to the following reasons: in treating sugar juice in a series of exchanger beds, the juice in one bed due to flow resistance in the subsequent beds, may rise unduly above the top strata of the exchanger bed, compressing the air above the liquid, thus creating an accumulated or "dead" volume of juice above the bed, and unduly increasing the detention time of the juice. On the other hand, with closed type tanks containing exchanger beds, back-pressure, due to the accumulation of gas or air liberated from the incoming juice, may depress the juice level to a point below the top strata of the exchanger bed, thus exposing emerged exchanger material and reducing the effectiveness or capacity of the exchanger bed. Air or gas may be entrapped in the feed juice, or gas may form in the juice due to side reactions, while undergoing ionic exchange. Gas or air or both collecting above the juice level in the cell may cause fluctuations of the juice level.

Therefore, it is another object of this invention to provide means whereby the liquid or solution level in the exchanger cell can be controlled, and be maintained above, although close to, the top strata of the exchanger bed, in other words, whereby the excess liquid volume above the exchanger bed can be kept at a minimum.

This object is attained by providing the closed tank containing the exchanger bed, with means whereby fluid pressure in the tank above the juice level can be controlled, in a manner that the level can be allowed to rise or be depressed correspondingly.

According to one feature this control is effected by varying the pressure of a gaseous medium in the space above the liquid level. For instance compressed air may be introduced into, or be released from the cell. The action of the compressed air in the space above the liquid level may be compared with the action of a piston, with the cell representing the cylinder in which it operates to control the liquid level. This variable air pressure cushion is therefore herein alternatively termed an air piston.

According to another feature such control is automatically effected in response to the juice level rising above, or falling below a predetermined limit, and it is herein termed automatic level control.

More specifically, control means are provided comprising photoelectric devices responsive to predetermined or critical limit positions of the juice level, whereby either pressure from the tank is released, or compressed air is admitted into the tank, as the case may be, in order to maintain the juice level adjusted between the upper and lower predetermined limits.

According to another embodiment, automatic means for effecting this pressure control comprise float controlled devices responsive to fluctuations of the juice level whereby pressure can be released from the tank, or else air pressure be introduced into the tank.

Other features reside in floating baffle means whereby feed liquid impinging upon the top of the bed is intercepted and distributed. By thus maintaining a level top strata of the bed there is maintained uniform effective depth and consequently uniform flow resistance and uniform effectiveness of the bed throughout. These baffle means are in the form of a perforated floating baffle plate sustained by the liquid level above the bed or resting upon the bed.

This baffle plate while protecting the top strata of the exchanger bed against disturbance from impinging feed liquid also acts as a displacement member, in that it occupies a portion of the liquid above the top strata of the settled exchanger bed, thereby reducing the effective excess volume of liquid above the bed. The baffle plate floats upwardly with the rising liquid level and thereby permits the unhampered expansion of the bed during the teetering phase thereof. The upward floating baffle plate is arrested within a margin of liquid to be maintained above the teether bed proper, and will then serve to absorb flow disturbances that might react into the teeter bed due to the withdrawal of liquid at the top.

According to another feature there is provided in this exchanger cell a central feed inlet and spray valve from which feed liquid or solution issues under pressure, being projected on to areas or zones concentric with the valve at the top of the exchanger bed.

More precisely, there is provided in the cell a central feed inlet conduit rising from the bottom portion of the cell and surrounded by the exchanger material, which inlet conduit terminates in a weighted valve through which the feed inlet under pressure is distributed over the top area of the exchanger bed. The exchanger bed surrounding the inlet conduit thus forms an unbroken and unobstructed mass, and may be maintained as such as of uniform depth and of uniform flow resistance therethrough.

Other features have to do with the mounting of the inlet conduit in the bottom portion of the exchanger cell.

Still other features provide means and a method of operating them, for effecting the up-flow washing of the exchanger bed, by teetering. Such means comprise a perforated plate, herein called constriction plate, upon which the exchanger material is supported, and which is constructed and operated in a manner to produce uniform up-flow of wash water throughout the area of the bed and at a rate to induce a true teeter condition in the bed, with the result that cloggings in the bed are broken up and a mobilized condition of all particles is established. A characteristic of such a true teeter bed is size stratification of the exchanger particles, which stratification is being maintained due to the sustained and uniformly distributed up-flow of the wash liquid through the teeter bed, while excess wash liquid is withdrawn at the top. Due to the size stratification of the exchanger grains, the holes in the constriction plate that sustains the bed, need not be larger than is necessary to prevent the passage therethrough of the coarsest fraction of the grains that constitute the bottom strata of the exchanger bed, while the number and distribution of the holes should be such as to make it possible to induce the up-flow teeter condition set forth.

The invention possesses other objects and features of advantage, some of which, with the foregoing, will be set forth in the following description. In the following description and in the claims, parts will be identified by specific names for convenience, but they are intended to be as generic in their application to similar parts as the art will permit. In the accompanying drawings there has been illustrated the best embodiments of the invention known to me, but such embodiments are to be regarded as typical only of other possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a part sectional side view of the exchanger unit or cell.

Figs. 2, 3 and 4 are cross-sections taken upon Fig. 1 along the lines 2—2, 3—3 and 4—4 respectively, to show details of the mounting of the constriction plate at the bottom of the tank, and details of the float baffle, and also to show (see particularly Fig. 2) details in the arrangement of the photoelectric devices for automatic control of the liquid level in the cell.

Fig. 5 shows parts of the exchanger cell drawn apart to expose more clearly assembly details thereof.

Fig. 6, Fig. 6a, and Fig. 6b illustrate more clearly the functioning of the photoelectric cell devices for automatically controlling the liquid level in the exchanger cell. Figs. 6a and 6b represent vertical detail sections along the lines 5—5 and 5'—5' respectively of the photoelectric control devices.

Figs. 8 to 13 are diagrammatic views illustrating various phases of the operating cycle of the unit.

Figure 1:
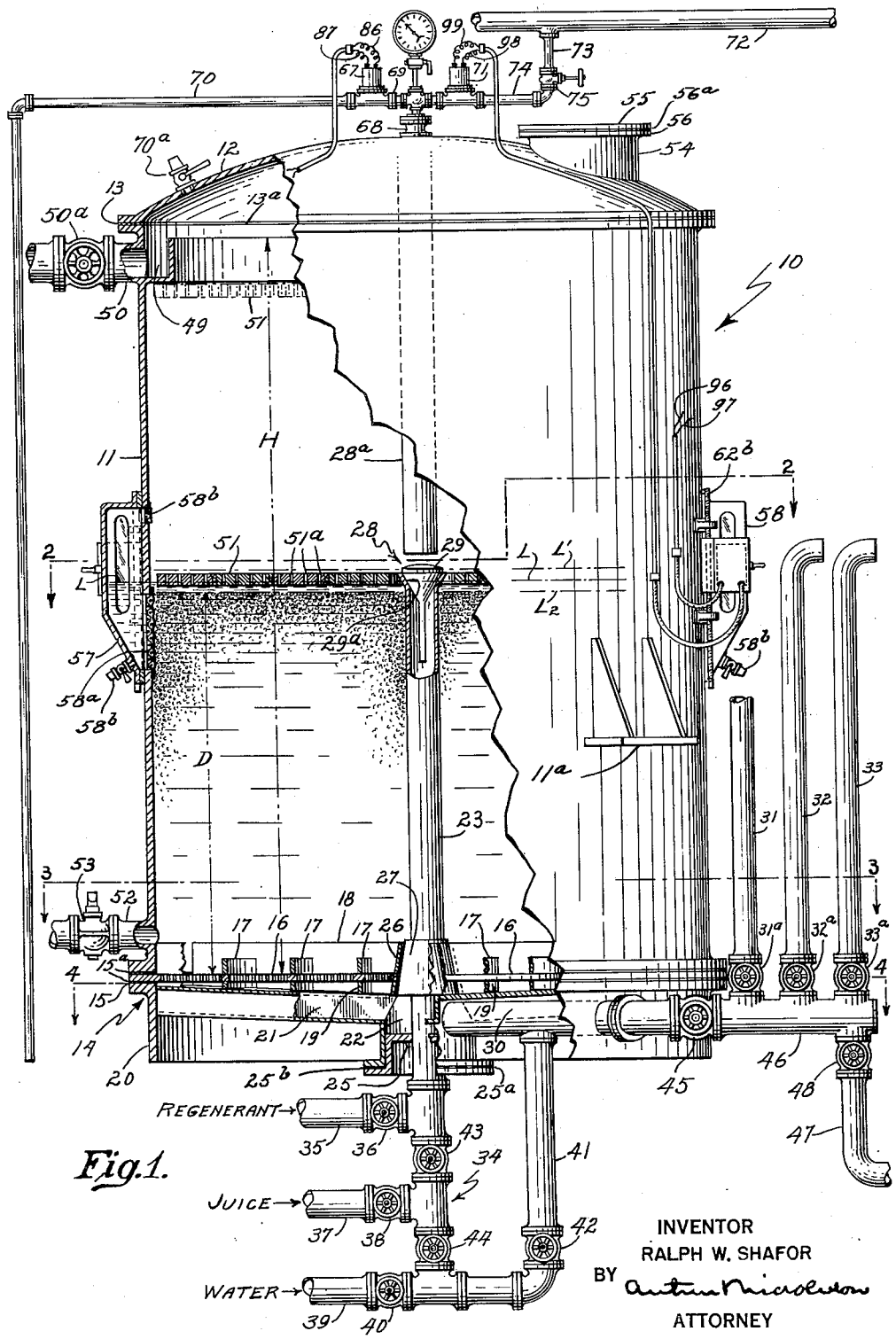

Inasmuch as the ionic purification treatment of sugar juices is herein chosen as an example of embodying this invention, and so that the environment of the invention thus embodied may be clearly understood, there now follows a brief description of the chemical exchange mechanism whereby ionic impurities or dissolved salts in the sugar juice are subtracted therefrom and replaced with the molar equivalent of pure and evaporable water.

In extracting non-sugars and especially salts from sugar-making juice or syrup, two main types of exchanger beds are used. One is called the cation exchanger bed that is characterized by its use of exchanger material that operates on the hydrogen-ion cycle and is adapted to collect from the juice plus or positively charged ions represented generally by calcium, magnesium, sodium and potassium. That is, as juice is supplied to the cation exchanger bed (or cell that contains the bed) so as to flow through it and out therefrom, cations of the juice exchange themselves for the hydrogen ions of the exchanger until the exchanger bed becomes exhausted of its exchange capacity and so saturated with those cations that it ceases substantially to exercise further exchange activity. Thereupon the cation bed must be regenerated by contact with a regenerant in the form of an ionized strong acid such as hydrochloric or sulphuric acids. During regeneration, the reverse process takes place in the exchanger, namely, the residual cations exchange with hydrogen ions of the acid regenerant so that the cations flow from the bed until the bed is completely recharged with hydrogen ions Juice that passes from the cation bed has had its impurity content of basic ions substantially removed, but it yet contains chlorides, sulphates and other such negative ionic impurities. So the juice substantially rid of its positive ionic or cation impurities, that have been left in the exchanger, is passed to and through an ion exchanger bed or cell that operates in a hydroxyl cycle. In passing through the anion bed, the chloride and sulphate, etc. ions of the juice are exchanged for the hydroxyl ions of the bed until the anion bed becomes saturated with chlorides and sulphates, etc. Thereupon the saturated anion bed must be regenerated by contact with some ionized alkali hydroxide or carbonate, especially sodium hydroxide or carbonate. During regeneration, the reverse process takes place, namely, the residual chloride and sulphate, etc. ions in the bed exchange with hydroxyl ions of the basic regenerant so that the negative ions or anions flow from the bed until the anion bed is recharged with hydroxyl ions. In passing through the anion bed, the juice is substantially rid of its negative or salt-forming ions since they have been left in the exchanger. Thus, the acid or positive ions of the juice are removed from it while passing through a cation exchanger bed and the negative or acid forming ions are removed from it while passing through a subsequent anion exchanger bed.

The exhaustion of a fresh exchanger bed, while the solution is flowing downwardly therethrough, proceeds in continuous fashion from the top to the bottom of the exchanger body. Hence, there exists a dividing line or zone of transition between the upper exhausted portion of the exchanger body and the lower non-exhausted portion of that body. This dividing line or zone keeps shifting downwardly through the exchanger body as the continuously through-flowing solution leaves an increasing exhausted exchanger portion behind while advancing through a correspondingly decreasing portion of non-exhausted or still-active exchanger. Since the dividing line is not necessarily a sharp one, there will be noticed a slowing down of the exchange intensity as the bottom of the exchanger bed is being approached. This is indicated by a corresponding rising of the pH of the solution leaving the exchanger, and it is a warning that a fresh or regenerated exchanger should be substituted for the one nearing exhaustion. The regeneration of an exchanger bed proceeds in a similar manner progressively through the bed.

In the course of a complete operating cycle, each of these exchangers if exhausted, is to have the residual juice therein displaced from the exchanger bed with wash water, and if deposits have collected on the exchanger granules they are to be washed out, before the exchanger is subjected to contact with the regenerant solution. Again, if regeneration is completed, the residual regenerant is to be displaced and washed out from the exchanger with water, before the exchanger is again contacted with the juice. In this way undesirable reactions between ionic constituents of the juice and regenerant solution in the exchanger bed can be avoided and the exchanger be kept in regular cyclic operation with substantially undiminished efficiency.

It is further to be noted that the cation and anion exchanger materials to be used in the treatment of sugar juice as herein exemplified, must be stable in the presence of acids and alkalis respectively, that is, they must be resistant to disintegration in such environments and substantially retain their granular condition. An example for a suitable cation exchanger for that purpose is the cation exchanger furnished by the Resinous Products Company of Philadelphia, under the name or identification of "Amberlite IR1." A suitable anion exchanger is furnished by the same source under the name or identification of "Amberlite IR 4." These are exchanger materials of synthetic resinous nature, and more specifically materials which are prepared by the condensation of a dissolved organic chemical of a group comprising sulfonated phenols and aromatic amines with an aldehyde.

From the foregoing description of the exchange operation involving the purification treatment of sugar juice, it will be understood that the juice, in passing through a cation and anion exchanger station, is temporarily acidified. That is to say, it passes through an acid phase in which it is first increasingly acidified because of acidity induced by the operation of the cation exchanger, and then again gradually deacidified because of the action of the anion exchanger in which the previously induced acid is replaced with pure water.

Since an acid environment in the juice promotes inversion of the sucrose, it becomes desirable to reduce to a minimum the time that the juice is detained in the acid phase. Accordingly, it is desirable to keep to a minimum any dead volume of juice in the treatment system, that is, any volume of juice not in contact with the exchanger bed through which it flows. This means, for instance, that the volume of acidified juice above an anion bed and flowing downwardly therethrough, should be kept as small as practical by maintaining the juice level in the exchanger cell close to the top surface of the exchanger bed. On the other hand, the juice level must not drop so far as to expose by emergence the top portion or top strata of the bed. According to this invention, air or gas pressure in the exchanger cell upon the liquid level above the bed is controlled so as to maintain the juice level at a desired elevation, that is to say, close enough to, but not too close to, the top of the exchanger bed.

Figure 3:
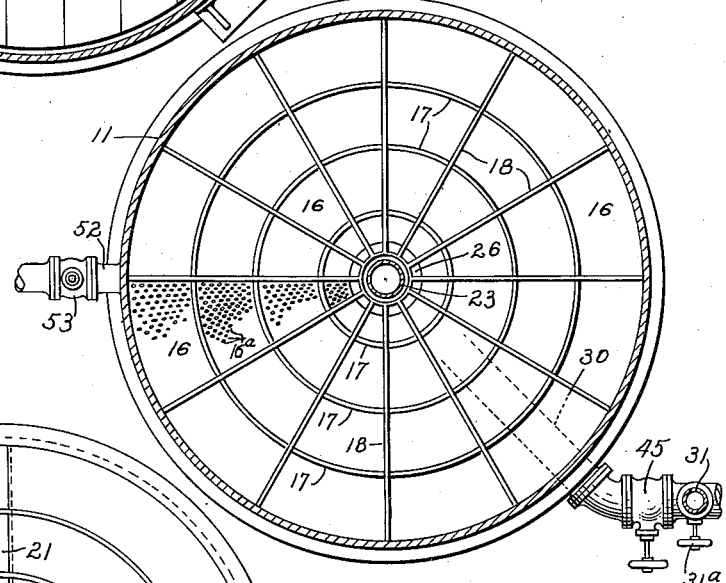
Figure 4:
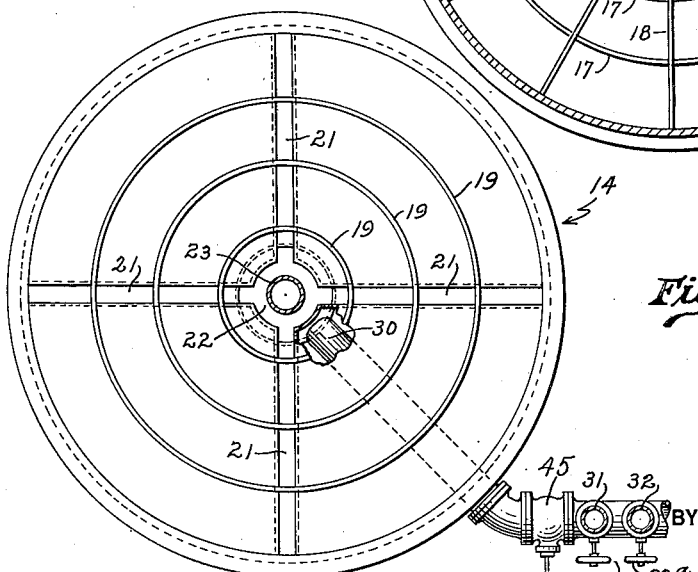
Figure 5:
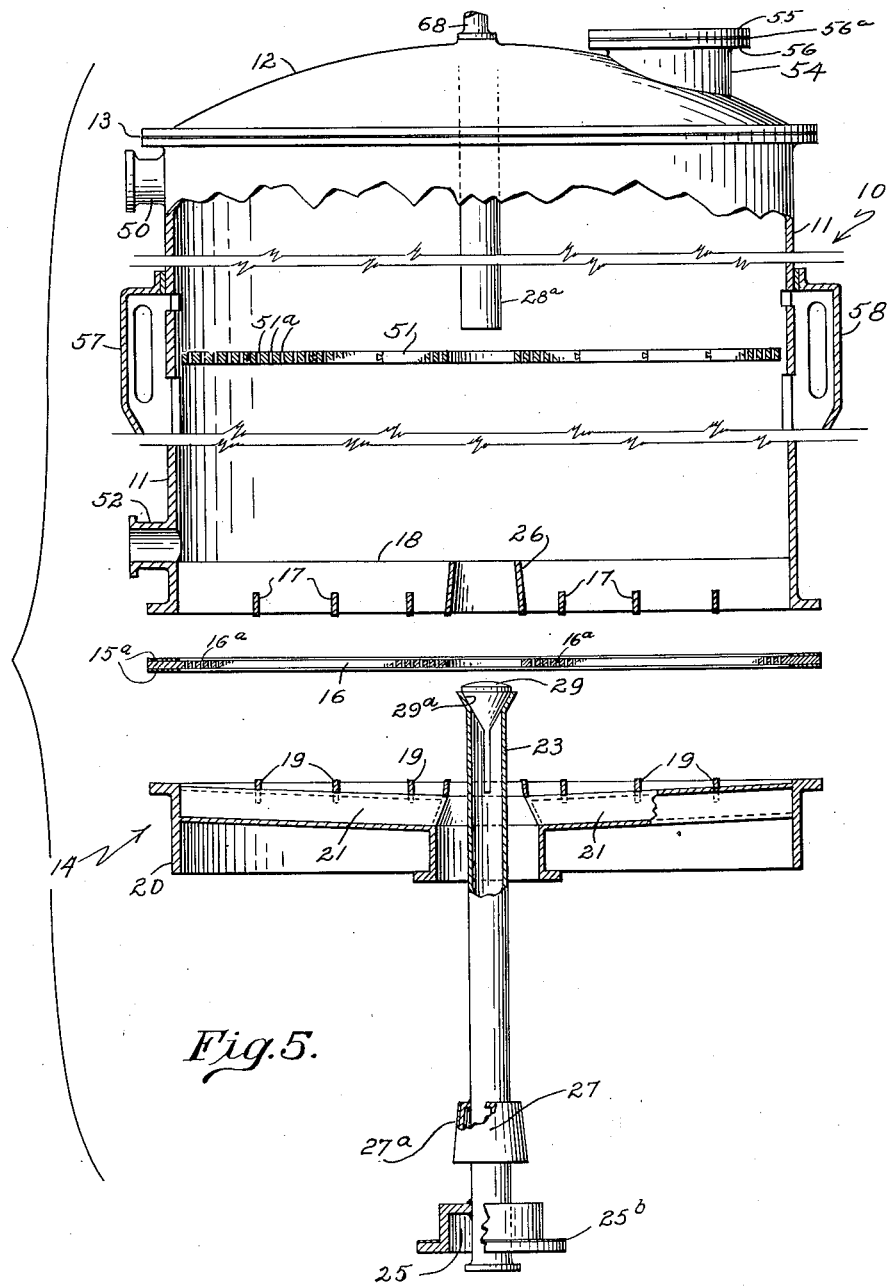

The exchanger unit or cell constructed according to this invention comprises a cylindrical upright tank 10, having a cylindrical body portion 11, provided with supporting brackets 11ª, a top cover portion 12 closing the upper end of the cylindrical portion and fastened thereto as by means of a bolt and flange connection 13, having a gasket 13ª, further having a bottom portion 14 that closes the lower end of the cylindrical body portion 11 and is fastened thereto means of a flange and bolt connection 15, gaskets being indicated at 15ª. Interposed between the lower end of the cylindrical portion 11 and the bottom portion 14 is a perforated plate 16 herein called constriction plate, that sustains the load of the granular exchanger material forming the exchanger bed in the cell bed which is herein designated by its depth D. The constriction plate 16 is confined at its upper as well as at its underside by a system of ribs, that are provided on a body portion 11 of the tank on the one hand, and on the bottom portion 14 on the other hand. The arrangement of which ribs or reinforcements may be seen more clearly from cross sectional views in Figures 3 and 4, and also in Figure 5 where the parts are drawn apart.

That is to say, the lower end of the body portion 11 is provided with a system of annular concentric ribs 17 intersected by radial ribs 18. The bottom portion 14 has concentric ribs 19 shown to match the concentric ribs 17 above. The bottom portion 14 of the cell is slightly conical and is shown to have an outer skirt portion 20 having the identical diameter as the cylindrical body portion 11 of the cell, and also to have four radial channels 21 leading into a central well 22. Through this central well 22 and continuing upwardly into the interior of the cell extends a feed induction pipe or feed conduit 23 which is held in place by means of a flange 25 that is unitary with the feed induction pipe and in turn fastened by means of flange and bolt connection 25ª and a gasket 25ᵇ to the bottom end of the central well 22. The feed induction pipe 23 is sealed against the constriction plate 16 through which it passes so as to prevent the passage of exchange granules or material into the well 22, the sealing means comprising a hollow conical portion or seat 26 that constitutes, so to speak, a hub from which radiate the radial ribs 18, which seat or hub 26, is unitary with the body portion 11 of the cell. These sealing means further comprise a conical portion 27 which in turn is unitary with the feed induction pipe 23 and fits the seat 26 when the induction pipe is mounted in place. The relationship of the parts such as the body portion 11 with its system of ribs 17 and 18 and hub 26, the constriction plate 16, the bottom portion 14 with its concentric ribs 19, its radial channels 21, and its central well 22 and the feed induction pipe 23 with its flange 24 and its conical portion 27, the relationship of all these parts with respect to one another appears more clearly from Figure 5, where the parts are drawn apart.

The feed induction pipe or conduit 23 is shown to extend about half way up the interior of the cell and to terminate at a point somewhat above the top strata of the bed D of exchanger material when in settled condition. The upper terminal portion of the feed induction pipe 23 is provided with an induction valve 28, comprising a valve body 29 and a valve seat 29ª therefor, the valve body being suitably weighted down upon its seat. The solution passing through the feed induction pipe upwardly under suitable pressure will lift the valve body 29 sufficiently from its seat to permit the feed liquid to be projected in trajectories from the induction valve 28 to annular zones concentric with the valve at the top of the exchanger bed. The lift of the valve body 29 is limited by a depending cylindrical member 28ª the upper end of which is fastened to the top cover portion 12 of the cell. Liquid introduced in this manner through the induction valve, flowing down through the depth D of the bed and passing through the perforations 16ª in the constriction plate 16, collects in the central well 22 by way of the radial channels 21, and leaves the well and the exchanger unit as a whole by way of a radial pipe 30. This pipe serves as a discharge pipe for liquid being treated, or else for spent regenerant solution having passed downwardly through the exchanger bed, but it may also serve as an in-leading connection for a reverse flow, that is, for wash water to be introduced from the bottom to flow upwardly through the exchanger bed, an operating phase hereinafter more fully to be described. From the radial pipe 30 the outflowing liquid may be allowed to pass upwardly through one of a number of risers or goosenecks or spigots 31, 32, 33, the point of overflow from which is placed high enough to normally keep the exchanger material in the bed in submergence.

In order to conduct a desired operating cycle (such as hereinafter described), there are further provided the following pipe connections and valves: A header 34 into which leads a connection 35 for regenerant solution having a valve 36, an inlet connection 37 for the liquid or solution such as sugar juice to be treated, a valve 38 for that connection, a water inlet connection 39 having a valve 40, and a water by-pass connection 41 having a valve 42 that permits shunting the water inlet from the header 34 to the radial pipe 30. The header 34 is provided with a valve 43 disposed intermediate regenerant inlet connection 35 and the juice inlet connection 37, and further provided with a valve 44 disposed intermediate juice inlet connection 37 and the water inlet connection 39. The radial pipe 30 has a shutoff valve 45 to be closed when wash water is to be introduced through that pipe from the bypass connection 41 into the bottom of the exchanger bed. The risers 31, 32, 33 have corresponding shutoff valve 31ª, 32ª, 33ª. It will be further seen that the radial pipe 30 connects with a header 46 from which rise the aforementioned risers 31, 32, 33 and from which also leads a pipe connection 47 provided with a shutoff valve 48 through which liquid or solution that has been treated in the exchanger bed of the cell, can be continued for further treatment such as in another exchanger unit or cell.

When in the course of the operating cycle the bed of exchanger material in the cell is to be washed in order to flush out therefrom solid phase impurities or the like, wash liquid or water can be introduced under pressure through the radial pipe 30 by opening the valves 40 and 42 and closing all other valves so far enumerated. From the radial pipe 30 the wash water passes into the central well 22 and then by way of the radial channels 21 to all points of the constriction plate 16 and through the holes 16ª thereof, upward the total effective height H of the interior of the cell, namely up to a point of overflow as represented by the overflow edge of a launder 49 that extends inside the cell and circumferentially along the upper end portion thereof. The wash liquid rises until it overflows into this launder from which it leaves the exchanger cell or unit through a discharge pipe 50 and a valve 50ª.

Normally, when the liquid from the induction valve 28 flows downwardly through the exchanger bed, there is to be maintained according to the object of this invention (and by means hereinafter to be described) an average or mean solution level L that is slightly above the top level of the material of the exchanger bed and preferably just sufficient to keep the material in submergence and thereby to keep the dead volume of liquid above the exchanger material at a minimum. The maintenance of an average level L is effected by certain control means whereby it can be either manually adjusted, or automatically controlled between an upper limit level $L_1$ and a lower limit level $L_2$. In Figure 1 the mean liquid level L is shown to support a floating annular perforated baffle plate 51 that is thus floatingly sustained in the solution above the bed close to the top strata thereof.

When the flow of liquid through the exchanger bed is reversed, namely when passing wash liquid upwardly therethrough during the wash or teetering phase of the operating cycle, the floating baffle 51 will rise with the rising level of the upflowing liquid as the material of the bed is gradually being thrown into suspension or so-called teeter. The height of the cell and the upflow rate of the wash liquid are sufficient to permit a desired teeter condition of the particles to establish itself without permitting the particles to reach the overflow from the cell. The upfloating baffle is incidentally arrested as it engages the underside of the launder 49 (see dot and dash line position of the baffle in Figure 1). Excess wash liquid that continues to rise through and to sustain the desired teeter bed, will pass through the perforation 51ª of the baffle plate 51, will overflow into the launder 49 and leave the cell through the discharge pipe 50 and valve 50ª.

Near its bottom the exchanger cell is provided with a drain connection 52 having a drain cock or valve 53. A manhole connection 54 is provided on the top cover portion 12 and is closed by a cover plate 55 having flange and bolt connection 56 and gasket 56ª.

There will now be described an arrangement of photo-electric control devices and their operation, whereby a mean liquid level above the exchanger bed is to be automatically maintained, by limiting that level L to fluctuations not in excess of the upper limit level $L_1$, or in excess of the lower limit level $L_2$. In this respect reference may be had to Figure 1 and Figure 6.

Figure 2:
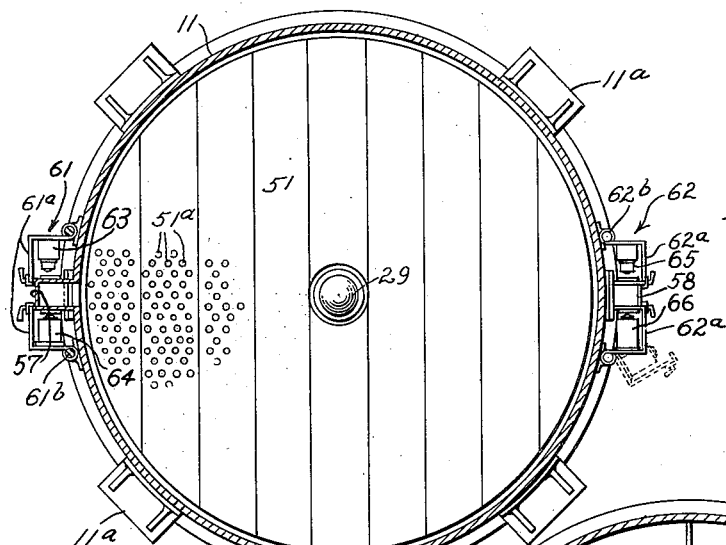
Figure 6:
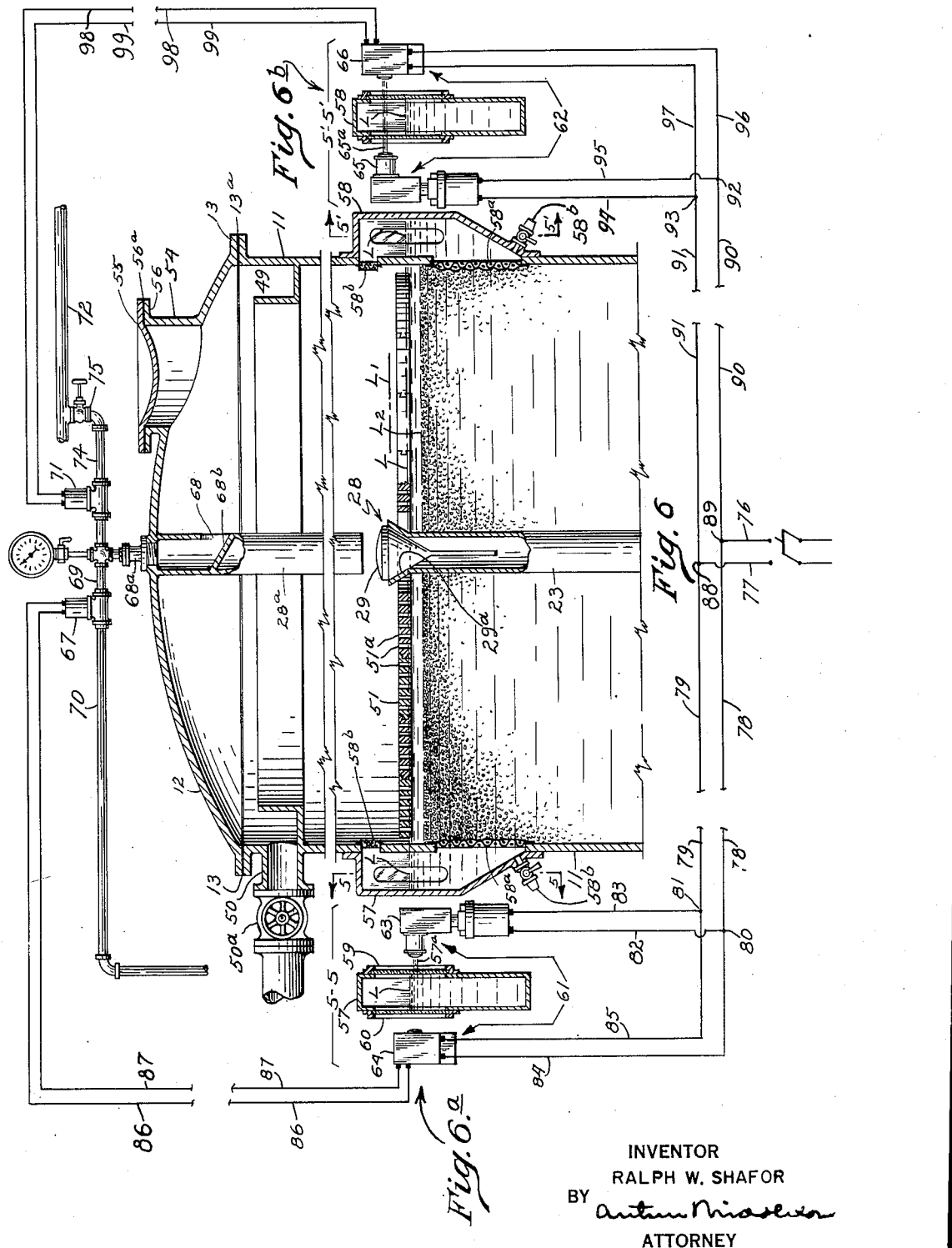

The principle relied upon to effect the desired liquid level control, is embodied in a pair of photo-electric devices to maintain the liquid level between the forementioned upper and lower limits, by releasing gas or air pressure above the level so as to permit the same to rise from its lower limit, or by introducing into the cell gas or air pressure whereby to depress the liquid level from its upper limit position. That is to say, one of the photo-electric devices will respond, when the lower limit level is reached, by causing through relay effect the release of air or gas pressure from the interior of the cell, whereas the other photo-electric device responds when the upper limit level is reached, by causing through relay effect the introduction of air or gas pressure into the interior of the cell. In this way the co-action of the two photo-electric devices will automatically maintain the liquid level within pre-determined upper and lower limits and thereby will keep to a minimum the undesirable dead volume of solution or sugar juice above the exchanger material proper. The two photo-electric devices will now be described by reference to numbers as follows (whereby reference is made more particularly to Figure 6 including the detail sections 5—5 and 5'—5' thereof). About midway between its top and bottom the exchanger cell or unit is shown to have provided at each side thereof a liquid level indicator casing 57 and 58 respectively. Each casing communicates with the interior of the cell by way of a lower opening and an upper opening, covered by a suitable liquid permeable member 58ª of screen material or wire mesh whereby granules of the exchanger material are kept out of the casings 57 and 58 respectively. The bottom of each casing 57 and 58 has a drain or clean-out connection shown in the form of drain cocks 58ᶜ, whereby exchanger particles that may have penetrated the screens 58ª and 58ᵇ can be removed or flushed out. Each casing has a transparent portion in the form of windows 59 and 60 respectively on opposite sides of the casing, so that a light ray sent through the transparent portion of the casing is either allowed to pass therethrough or is arrested or obscured, depending upon whether or not liquid fluctuating in the casing intervenes or does not intervene in the path of the light ray, since the casing has hydraulic communication with the liquid in the cell. That is to say, the liquid such as sugar juice may obscure the light ray, and the photo-electric device may be so adjusted as to send out a control impulse in response to the obscuring of the light ray. Conversely the device may be so adjusted as to be inactive while the light ray is obscured, but to send out a control impulse when the light ray is free to pass through the transparent portion of the corresponding indicator casing or chamber. The transparent portion of the indicator chamber 57 is interposed in the path of a light ray of a photo-electric device 61 whereas the other indicator chamber 58 is interposed in the path of a light ray of another photo-electric device 62 with the addition of swingable cover portions 61ª and 62ª respectively. Each of the photo-electric devices is vertically adjustable as indicated by vertical spindles 61ᵇ and 62ᵇ. Figure 2 shows these photo-electric devices in plan view, whereas Figure 6 includes detail sections 5—5 and 5'—5' of the respective photo-electric devices, from which their disposition and function can be more clearly understood. Referring more particularly to Figure 6, the photo-electric device 61 comprises a light source unit 63 at one side of the indicator casing 57 and a light responsive relay unit 64 at the opposite side of the indicator casing 57. Similarly the other photo-electric device 62 comprises a light source unit 65 at one side of the indicator casing 58 and a light responsive relay unit 66 at the opposite side of the indicator casing 58. The photo-electric device 61 is so positioned and adjusted that it will remain inactive or nonresponsive as long as liquid in the indicator casing 57 stands high enough to obscure or interfere with the passage of a light ray 57$^a$ therethrough from the light source unit 63. This is the case when the liquid level is above its lower limit $L_2$ and for instance at its intermediate level L. If due to a change in the pressure conditions in the interior of the cell, the level drops to its lower limit position, the light ray emanating from the light source unit 63 will pass through the transparent portion of the indicator casing 57 and strike the light responsive relay unit 64 causing the same to set up a relay circuit whereby a solenoid controlled relief valve 67 is opened and interior pressure from a gaseous medium such as air in the cell is released through opening 68 in the member 28$^a$, and by way of pipe connections 68$^a$, 69, 70. A hand operated vent cock 70$^a$ is shown to be provided in the cover portion 12 of the tank. A partition wall 68$^b$ in the hollow member 28$^a$ is shown sloping down towards the lower edge portion of the opening 68. This permits the liquid level to rise as the introduction of feed liquid to the cell continues, and in rising the liquid again obscures the light ray 57$^a$ through the indicator casing 57 thereby interrupting the relay circuit and consequently deenergizing the solenoid of the relief valve 67, allowing the same to close. The new liquid level thus established is intermediate the predetermined upper and lower limits, and will remain so as long as no further undue pressure fluctuations occur in the interior of the cell.

The other photo-electric device 62 operates similarly in that it responds to a rise of the liquid level to the upper limit $L_1$. That is to say, the photo-electric device 62 is so positioned and adjusted with respect to its associated indicator casing 58, that normally and as long as the liquid level remains below its upper limit $L_1$, the light ray 65$^a$ emanating from the light source unit 65 remains unobstructed, since its path is not interfered with by an undue rise of liquid in the indicator chamber. If, however, an increase of flow resistance in the bed, or a change of air pressure in the cell causes the liquid level to rise to its predetermined upper limit, such rise will obscure the light ray normally passing through the indicator casing 58 and the light responsive relay unit 66 will thereby be caused to set up a relay circuit energizing the solenoid of a solenoid controlled air pressure supply valve 71, causing the same to open and to force compressed air from the air pressure supply pipe 72 through pipe connections 74, 68 into the interior of the cell. The solenoid controlled valves 67 and 71 may be such as shown in the General Electric Co.'s Industrial Control Handbook of May 1, 1939, CR-9507, page 5, and page 6. There is also shown a hand-controlled valve 75 in the air pressure supply connection 74.

It will be noted that both photo-electric devices 61 and 62 are supplied by a common source of power indicated by the two conductors 76 and 77. Branch conduits 78 and 79 lead to points 80 and 81 from where one branch circuit represented by conductors 82 and 83 feeds the light source unit 63, and another parallel branch circuit leading into and out of the light responsive relay unit 64 comprising conductors 84, 85, 86, 87, which branch circuit when closed by the light responsive unit 64 actuates the relief valve 67 by energizing the solenoid thereof.

Similar branch circuits supply the other photo-electric device 62 and its associated solenoid controlled air pressure supply valve 71. That is to say from points 88 and 29 of the common source of power supply branch conductors 90 and 91 extend to points 92 and 93 from where one branch circuit represented by conductors 94 and 95, feeds the light source unit 65, while another branch circuit represented by conductors 96, 97, 98, 99 when closed by the light responsive unit 66 energizes the solenoid of the solenoid controlled pressure supply valve 71.

From the foregoing it will be understood that, while the liquid level L in the cell remains within the space intermediate the upper and lower limits $L_1$ and $L_2$, the relays of the photo-electric devices will remain inactive, so that the two solenoid controlled valves 67 and 71 will remain closed. When the air volume in the cell increases, as may be the case due to entrapped air entering with the feed liquid and collecting as an air cushion above the liquid, or because of gases forming as a result of chemical reactions incident to the ionic exchange process in the cell, such accumulation of a gaseous medium will depress the liquid level. If the depression reaches the lower limit $L_2$ it will be automatically corrected, since the photo-electric device 61 then operates to open the relief valve 67 until a mean level L has again restored itself. Should, on the other hand, the level rise to reach the upper limit $L_1$ as may be the case due to some increased resistance to the flow of the liquid through the bed or a series of beds, then the photo-electric device 62 will operate to open the air pressure supply valve 71 to admit compressed air into the cell long enough to restore or depress the level of a mean position L.

Figures 16, 17:
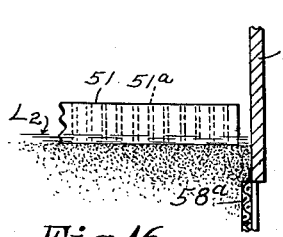
Figs. 16, 17 and 18 are detail views showing a lower limit position, a normal or mean position, and an upper limit position of the liquid level above the exchanger bed and corresponding positions of the floating baffle member.
Figure 18:
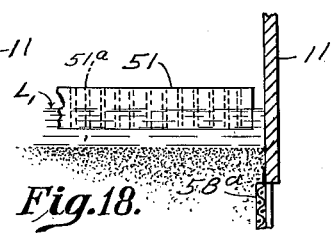

As the liquid level in the exchanger cell varies, the floatable baffle plate 51 may vary in position accordingly, as exemplified in the detail showing of Figures 16, 17 and 18. When the level assumes the lower limit position $L_2$ (see Figure 16), the baffle plate is shown to be resting on top of the exchanger bed. When the level assumes the mean or normal position L (see Figure 17), the baffle plate is shown to be just about floating with only a thin stratum of liquid between it and the bed, whereas when the level assumes its upper limit floating position $L_1$ (see Figure 18), the liquid strata between the baffle and the bed is accordingly somewhat deeper. In all three positions however, the baffle plate 51 also functions as a liquid displacing member, with the result that whatever the volume of the liquid above the exchanger bed, that volume is reduced by the displacement of the floating baffle 51. This means in effect that corresponding smaller differentials of liquid volume above the exchanger bed will operate the automatic level control and that a correspondingly smaller average of excess liquid is present at any time above the liquid level.

As an example, by means of the photo-electric device just described the liquid level in the exchanger cell may be controlled in such a manner that it does not fluctuate, for instance, more than three inches above, and three inches below the mean level L; in other words, the control may be such that the upper limit level $L_1$ is not more than three inches above, and the lower limit level $L_2$ and more than three inches below the mean level L. The position of the two limit levels in turn may be such that, for instance, the lower limit level $L_2$ is substantially not more and not less than about one-half inch above the top of the exchanger bed. This means that the level is controlled within six inches maximum deviation and is at least one-half inch, and at most six and one-half inches above, the top strata of the exchanger bed. Considering a bed of 6 feet depth with 60% voids between the grains of the bed, this would mean an approximate fluctuation of 7% of the time of detention of the juice in the bed.

Figure 7:
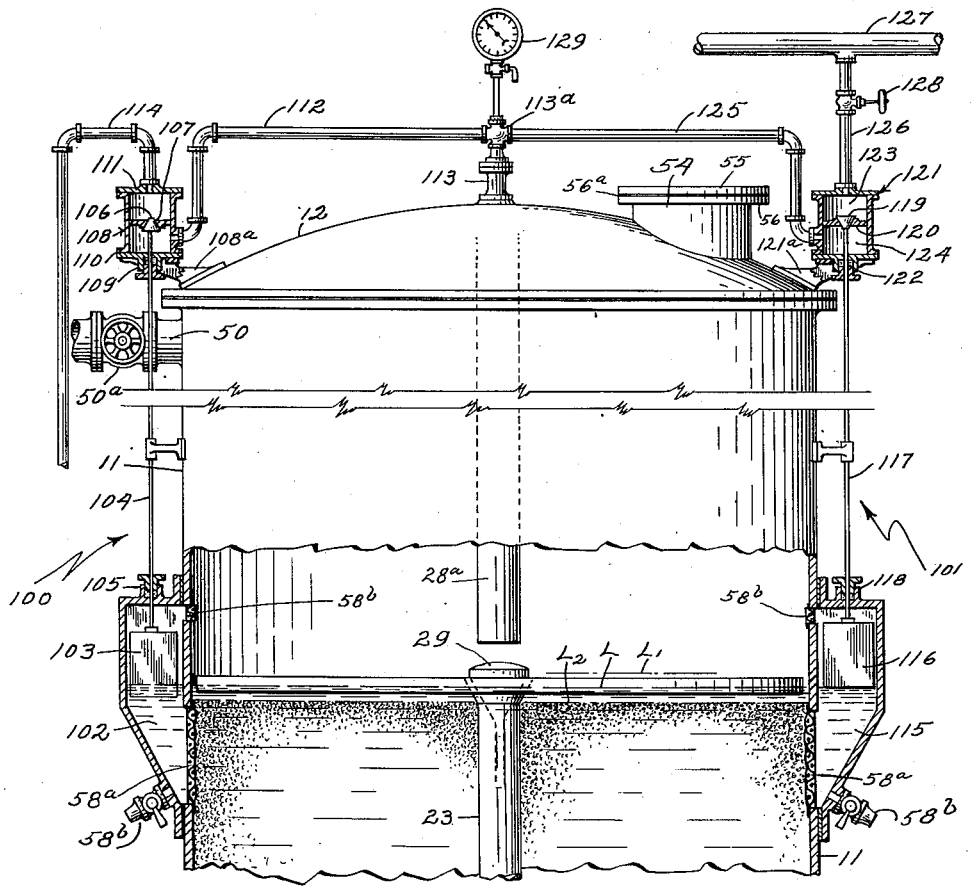
Fig. 7 shows a modification in the automatic liquid level control for the exchanger cell, in that the control is effected by means of float devices.

As a modification, instead of the photo-electric control devices, Fig. 7 shows a pair of float controlled devices or valves whereby the liquid level in the exchanger cell can be similarly controlled, namely, so as to be maintained within an upper and a lower limit by means of automatically adjusting the gas or air pressure above the level in the cell. These devices are in the nature of float controlled valve units 100 and 101 respectively, the one being a relief valve unit and the other a pressure supply unit. The relief valve unit 100 releases excess pressure from the interior of the cell, the pressure supply valve unit 101 introduces a gaseous pressure medium, such as compressed air, into the interior of the cell.

The valve unit 100 comprises a float chamber 102 communicating with the liquid that submerges the exchanger bed in the cell, a float member 10 in the chamber, from which a valve stem 104 extends upwardly through a gland 105. The stem 104 carries a valve disk 106 engaging a valve seat 107 in a valve housing 108 having a gland 109 through which the valve stem 104 extends into the valve housing. The valve housing 108 mounted on the top cover portion 12 by means of a bracket 108$^a$, has a lower chamber 110 and an upper chamber 111. The lower chamber 110 connects with a pressure release pipe 112 leading to a pipe connection 113 extending centrally through the top cover portion 12 into the interior of the cell. A drop of the liquid level in the cell lowers the float member 103 moving the valve disk 106 downwardly from its seat 107, thereby releasing excess pressure from the interior of the cell into the upper valve chamber 111 and through a vent pipe connection 114 out into the atmosphere.

Similarly, the pressure supply valve unit 101 comprises a float chamber 115 communicating with the liquid in the exchanger cell, a float member 116 in the float chamber, from which a valve stem 117 extends upwardly through a gland 118. The upper end of the valve stem 117 carries a valve disk 119 engaging a valve seat 120 in a valve housing 121 into which housing the valve stem 117 extends by way of a gland 122. The valve housing 121 mounted on the top cover portion 12 by means of a bracket 121$^a$ has an upper chamber 123 and a lower chamber 124. The lower chamber 124 connects with an air pressure induction pipe 125 leading into the pipe connection 113. The pressure induction pipe 125 and the pressure release pipe 112 form a common junction 113$^a$ with the pipe connection 113 that extends into the interior of the cell. The upper chamber 123 connects with an air pressure supply pipe 126 coming from a compressed air supply header 127 and has a hand-operated shut-off valve 128. A pressure gauge 129 is provided, indicating the pressure in the interior of the cell.

It will be noted that the pressure relief valve unit 100 operates in an opposite sense to that of the pressure supply valve unit 101. That is to say, whenever the liquid level drops or is depressed to a predetermined minimum $L_2$ in the course of the operation of the cell, this will cause the relief valve unit 100 to open by moving the valve disk 106 downwardly and away from its seat 107, thereby relieving excess pressure in the cell by allowing it to escape through the vent pipe 114 into the atmosphere, and thereby permitting the liquid level to rise, provided the flow of feed liquid continues normally. A falling of the level will leave the valve disk 119 of the other valve unit 101 weighted down upon its seat 120, thus keeping the compressed air supply from the header 127 shut off from the interior of the cell. If on the other hand, the level in the cell rises to a predetermined maximum $L_1$, this will force the relief valve disk 106 upwardly, keeping it closed, while lifting the pressure supply valve disk 119 upwardly from its seat 120, thereby admitting compressed air to the interior of the cell through the pressure induction pipe 125, provided the pressure supply valve 128 is open. By suitable arrangement and adjustment of both flow control valve units 100 and 101 with respect to one another and with respect to the top of the exchanger bed, the liquid level above the exchanger bed may be controlled so as to be maintained within an upper and a lower predetermined level above the top of the exchanger bed, with the result substantially as described in connection with the operation of the photo-electric devices previously described in connection with Figs. 1 and 6.

The importance of the constructional features of the exchanger cell and of the control accessories therefor, will be more clearly understood from an analysis of the operating cycle of the cell, especially where the purification treatment of sugar juice is involved.

During one portion of this cycle the sugar juice to be treated, the sweetening-off water and subsequently the regenerant solution and final wash water therefor, are passed in a downflow through the exchanger bed. Namely, (see Fig. 1), the liquid or solution is introduced into the cell under pressure as by way of the central feed induction pipe 23 and the weighted induction valve 28. Accordingly the entering liquid is shown as being projected from the valve 28 in trajectories to annular zones surrounding the valve. The projected liquid is intercepted by the floating perforated baffle plate 51 which helps to distribute the liquid uniformly over the area of the bed and prevents it from impinging directly upon the bed and from disturbing, pitting, or eroding the surface strata thereof. In this way, there is prevented a disturbance of the uniformity of effective depth of the bed, and thereby a reduction in the effectiveness thereof.

The liquid, solution, or sugar juice thus introduced under pressure passes downwardly through the bed D of exchanger material, and through the holes 16$^a$ in the constriction plate 16, and by way of the radial channels 21 to the central well 22 from where it passes out through the horizontal radial pipe 30. During this downflow phase of the operation the overflow discharge valve 50ª at the top of the cell must be closed in view of the air pressure conditions to be maintained in the cell by the liquid level control devices such as the photo-electric devices or float controlled valve units above described.

Another phase of the operating cycle of the exchanger cell comprises a reverse flow, that is, an upward flow of the teeter wash liquid through the exchanger bed. In that case wash water is passed from the water supply pipe 39 through valve 40 and through the by-pass connection 41 by way of valve 42 into the radial pipe 30, valves 36, 43, 38, 44 and 45, meanwhile being closed while the valve 50ª at the top of the unit is open. The water passes into the central well 22 from where it distributes itself by way of the radial channels 21 to the concentric zones as defined by the annular concentric ribs 19, and thus over the area of the constriction plate 16. The water rises through the holes 16ª of the constriction plate, creating a hydraulic upflow condition to throw into suspension at least a portion of the particles or granules of the bed. According to the concept of this invention, the hydraulic flow condition thus being created, is to be such that a suspended or teeter condition of the particles is established, whereby size stratification is effected. This means that the upflow conditions are such that the finest particles range themselves in the top strata, and that in the downwardly succeeding strata the particles become increasingly coarse, with the coarsest size at the bottom.

Figure 14:
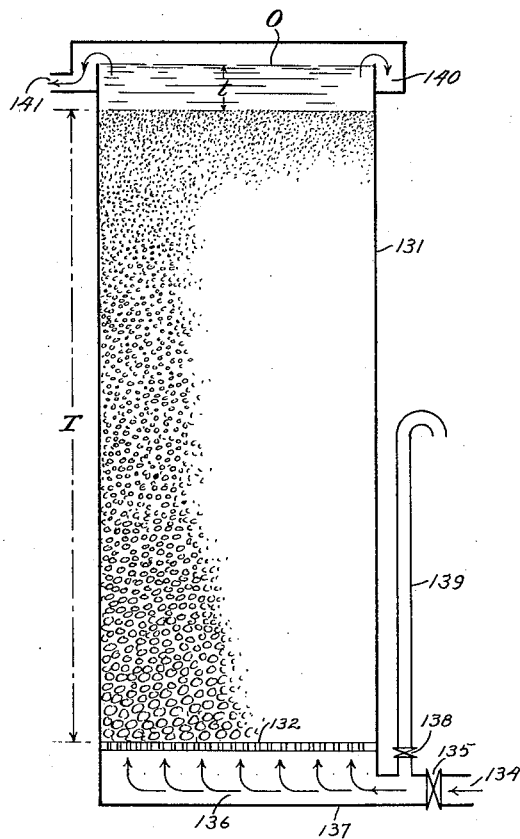
Figs. 14 and 15 are diagrammatic illustrations of the method for effecting and maintaining a bed of exchanger material in which the particles or granules are stratified according to size.
Figure 15:
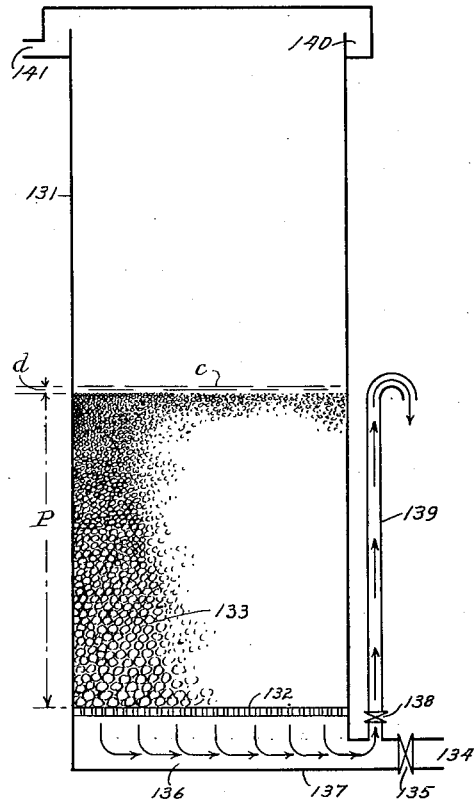

The character of the teeter condition as compared with the settled condition of the exchanger material in the bed, is illustrated in diagrammatic fashion in Figs. 14 and 15 respectively.

In Fig. 14 there is diagrammatically shown a tank 131 having spaced from the bottom a perforated plate 132 adapted to support the bed of exchanger material 133 (see Fig. 15). Wash water is indicated by arrow 134 to enter through a valve 135 the space 136 between the bottom 137 of the tank and the perforated plate 132, while the valve 138 of a riser or gooseneck or spigot pipe 139 is closed. Providing suitable conditions (such as will be discussed below), the liquid flowing upwardly through the perforated plate 132 passes through the exchanger bed at a rate whereby the granules or particles of the material in the bed are first loosened up and then thrown into suspension. In this way under sustained upflow of the liquid, a teeter bed is formed in which the particles are free enough to move so as to classify themselves in strata as to size, following the hydraulic law underlying this phenomenon. The finest particles are thus brought to the top strata while the coarsest remain at the bottom. Under suitably controlled flow conditions the expanded or teeter bed of particles is shown in Fig. 14 to have a depth T leaving a depth $t$ of clear liquid above the top strata of the teeter bed, the liquid level O being defined by the overflow edge of an overflow launder 140 from which overflowing liquid is discharged as at 141.

Fig. 15 contrasts with Fig. 14, in that it illustrates the condition of the granules and particles of the exchanger bed, when the same have again subsided into a settled, even though liquid, permeable mass that is supported by the perforated plate 132. This condition, of course, develops when the upflow of liquid is stopped and, instead, the excess liquid allowed to drain out of the tank through the riser 139, when the valve 135 is closed and the valve 138 is open. The particles of the bed then having settled down upon the perforated plate 132 to establish a bed of the depth P with a final clear water level C adjusting itself a slight distance $d$ above the top strata of the bed, corresponding to the overflow level of the spigot pipe or riser 139. Under the conditions herein assumed to prevail, it will be noted that the expanded or teeter bed assumes a depth T (see Fig. 14) that is herein shown to be approximately twice the depth P of the bed of settled particles (in Fig. 15).

It is a concept of this invention to include in the operating cycle a period during which a teeter bed is maintained, to serve the dual purpose of: (1) to enable solid phase impurities or deposits to be washed out thoroughly from the bed, and (2) to cause the particles or granules to range themselves in strata according to size, with the finest at the top and the coarsest at the bottom of the bed. According to the invention the teeter condition of the bed is to be established by means of a suitable liquid permeable means, and such means are herein shown to comprise a suitably perforated retaining plate, or perforated false bottom, or as it is herein called, a constriction plate. The constriction plate 16 sustains the bed of granular material when the same is in settled condition. While it is desirable to have the holes 16ª in the constriction plate large enough to reduce the head loss therethrough to a minimum, they should substantially not be larger than the coarsest size particles that have ranged themselves in the bottom strata of the bed, since no particles must be allowed to fall through the holes and thereby deplete the bed of its material. That is to say, the holes should substantially be just small enough to enable the constriction plate to effectively sustain the largest size particles and hence the bulk of the bed thereon. It thus appears that the size of the holes 16ª in the constriction plate may be found by determining the size of the coarsest grade particles and its proportion in the mixture. A screen test of the mixture will render the desired data in term of mesh sizes. The upflow velocity required to establish the teeter bed may be attained by means of hydraulic resistance and teeter tests on the material that is to constitute the bed.

There will now be described the sequence of operating phases constituting the complete operating cycle of the exchanger cell. The sequence of phases is diagrammatically represented in corresponding Figs. 8 to 13. In each phase or figure the flow of the liquid, solution, or juice, is indicated by a line or lines of arrows, making these figures at least partly self-explanatory. The sequence of operating phases is as follows:

Fig. 8 is the juice treatment phase;
Fig. 9 is the juice displacement phase;
Fig. 10 is the teetering phase;
Fig. 11 is the excess water drainage phase, when the particles in teeter subside and come to rest.
Fig. 12 is the regeneration phase;
Fig. 13 is the regenerant displacement phase.

In Fig. 8 sugar juice from the juice supply line 37 passes (in the direction of the arrows) through the valves 38 and 43, and upwardly through the feed induction pipe 23, and then in overcoming the pressure of the induction valve body 29, the juice is projected along trajectories 130 onto zones concentric with the induction valve 28. The juice strikes the perforated floating baffle plate 51 whereby it is evenly distributed over the area of the bed without stirring or disturbing the top strata thereof by the impact of impingement. The juice then passes downwardly through the exchanger bed D, through the constriction plate 16, and by way of the central well 22 and through the radial pipe 30, out of the cell unit. In accordance with the flow of the juice through the unit as indicated by the arrows, all valves through which the juice is not shown to pass in Fig. 8, are closed. It will also be noted that all valves and pipe connections in this diagram (as well as in the others, Figs. 9 to 13) are numbered the same as corresponding ones shown in Fig. 1.

In Fig. 9 the flow of juice down through the bed is shown to have been stopped because of the exchange capacity of the bed is now assumed to have been exhausted. The residual juice in the bed must be displaced with wash water before the regeneration of the bed can be undertaken. Therefore Fig. 9 shows (by means of arrows) the displacing wash water entering through the water supply pipe 39, and valves 44 and 43, through the induction pipe 23, and against the weight of the valve body 29, into the cell. Due to the pressure it projects in trajectories to zones concentric wtih the induction valve 28. It passes through the perforations of the baffle plate downwardly through the bed, through the constriction plate 16, the well 22, the valves 45 and 31ª, and again up the riser 31 whence it discharges. This downflow of wash water is maintained until all the residual juice has been displaced.

The exchanger bed is now ready for the teetering operation that is illustrated in Figs. 10 and 14. This comprises, as has been previously explained, an upflow through the bed of wash liquid whereby solid phase impurities are washed out from the exchanger bed while size stratification of the particles is being established. Wash water enters from the wash water supply pipe 39, passes through the valve 40 and continues through the by-pass connection 41 by way of the valve 42, leading into the central well 22 from where it distributes itself over the space between the constriction plate 16 and the bottom of the cell. As indicated by the arrows, the wash liquid flows upwardly and causes the normally settled exchanger bed to expand upwardly by forming a teeter bed of the depth T in which the particles or grains are kept in suspension by suitable sustained upward flow conditions, and at the same time range themselves in strata according to size, with the smallest particles in the top strata and the coarsest ones at the bottom. Under the flow conditions herein considered, there remains a depth $t$ (see Fig. 14) of clear water between the top of the teeter bed and the point of overflow into the launder 49. During this upflow operating phase the outlet valve 50ª at the top of the cell is open to permit discharge of spent teeter water, but all other valves at the lower end of the cell, and through which the water is not shown to flow, are closed. This sustained teeter condition due to upflowing wash liquid is continued until the solid phase impurities will have been substantially flushed out. It will also be noted that the perforated baffle plate 51 during this phase has been floated upwardly to a point at the top of the cell where it is arrested even though submerged in the margin of wash water above the teeter bed T proper. In this arrested position the baffle plate 51 now acts as a flow equalizer in the sense that it tends to prevent flow disturbances caused by the withdrawal of the spent teeter waters at the top of the cell, from reacting with the teeter bed and disturbing the uniform upflow condition thereof.

After the exchanger bed has thus been sufficiently cleansed, the particles must be allowed to settle back again, which is effected by permitting excess liquid to drain back through the bottom of the cell that is downward through the constriction plate 16, the central well 22, the radial pipe 30, valve 45 and again upwardly through the riser 33 from which it overflows at an elevation that corresponds to the liquid level substantially to be maintained above the bed of settled particles in the cell. It will be noted that the baffle plate 51 accordingly is carried from its upper (Fig. 10) position downward with the falling liquid level in Fig. 11 until it comes to rest again with the liquid level at the overflow elevation of the riser 33, when the exchanger grains have come to rest and the cell is ready for the regeneration phase. During this draining operation, of course, the valve 50ª remains open, but all other valves at the bottom end of the cell through which the draining liquid is not shown to flow, are closed.

According to Fig. 12 regenerant solution enters the unit from a supply pipe 35, flows through valve 36, and then passes throug the central vertical induction pipe 23 substantially in the same manner as described in conjunction with Figs. 8 and 9. At the bottom of the exchanger bed the spent regenerant liquor leaves the unit by way of the central well 22, the radial pipe 30, the valve 45, and by overflowing from the riser 32. This flow of regenerant solution through the bed is continued until the bed is considered sufficiently regenerated for re-use in the operating cycle, that is, for re-use in purification treatment of the sugar juice. During the operating phase shown in Figs. 8, 9, 12, 13 the automatic control of the liquid level in the cell may be allowed to function as set forth. During the teeter washing phase (see Fig. 10) however, this control is to be inoperative. In the subsequent wash water draining or solids settling phase (see Fig. 11), the automatic level control may again be allowed to function, and since it will then respond by admitting compressed air into the space above the liquid level, after the valve 50ª has been closed, this will have the effect of expediting the downward discharge of the wash water until the normal operating level is again restored.

But before sugar juice can again be applied to the exchanger bed, the residual regenerant liquid in the bed must be displaced. This phase of the operating cycle is shown in Fig. 13 where wash water from pipe 39 passes by way of the central vertical induction pipe 23 and then downwardly through the exchanger bed substantially similar to the manner described in conjunction with the juice displacement phase in Fig. 9, except that in Fig. 13 the outflowing liquid leaves the unit by way of the riser 32.

In view of the acidity of the juice and of the acid liquors respectively, to which the interior of the cell and its connections are exposed, their walls are made suitably acid-proof as by rubber coating. A conical acid-proof gasket 27ª (see Fig. 5) is shown to surround the conical portion 27 of the feed induction pipe 23.

I claim:

1. An exchanger cell comprising a receptacle adapted to hold a bed of granular exchanger material occupying a portion of the cell whereby there is left a substantial free volume above the bed, a vertical feed conduit extending from the bottom of the receptacle through said bed to a point above the top strata of the bed, controllable inlet means for passing liquid to be treated into and upwardly through said feed conduit, said inlet means adapted to be closed when the supply of said liquid is to be shut off from said feed conduit, means for discharging the liquid having passed through the bed from the bottom of the receptacle substantially at a rate at which it is fed whereby the bed is kept substantially in submergence, said feed conduit being provided with a valve seat at the upper end thereof, one-way valve means provided at the upper end of said feed conduit, and effective to admit liquid fed under pressure to said receptacle, means for passing an upward flow of wash water through said bed while the supply of pressure fed liquid to the feed conduit is shut off, which means comprise controllable inlet means for admitting the wash water under pressure at the bottom of the bed causing the level of the wash liquid to rise above said valve seat and into said free volume of the receptacle, overflow means leading from the upper portion of the receptacle and determining the maximum level of the wash water, and shut-off means for said overflow means.

2. An exchanger cell according to claim 1, in which the receptacle has a top closure portion, with the addition of control means for maintaining the level of the liquid in which the bed is submerged between an upper and a lower limit, comprising a source of an auxiliary gaseous pressure medium, means operable to admit a quantity of said pressure medium into said receptacle to effect displacement of liquid from the receptacle through said discharge means when the level has unduly risen, and to shut off the admission of pressure medium when the level has been sufficiently lowered, and operable to release a quantity of said auxiliary pressure medium from the receptacle to allow the liquid level to rise when the same has unduly dropped, and to shut off the release when the level has been sufficiently raised.

3. An exchanger cell according to claim 1, in which the receptacle has a top closure portion, with the addition of automatic control means for maintaining the level of the liquid in which the bed is submerged between an upper and a lower limit, comprising a source of auxiliary gaseous pressure medium, valve means operable to admit a quantity of said pressure medium into said receptacle to displace liquid therefrom when the level has unduly risen, and to shut off the admission of pressure medium when the level has been sufficiently lowered, and operable to release a quantity of said auxiliary pressure medium from the receptacle to allow the liquid level to rise when the same has unduly dropped, and to shut off the release when the level has been sufficiently raised, float controlled devices actuated by said liquid level, and actuating means effective between said devices and said admitting- and said releasing means for automatically maintaining said level within said limits.

4. An exchanger cell according to claim 1, with the addition of means for passing auxiliary water up through the feed conduit after the supply thereto of liquid to be treated has been shut off, whereby there is effected a downward displacement of the residual liquid in the bed by said auxiliary water.

5. An exchanger cell according to claim 1, with the addition that said overflow means comprise an overflow launder disposed circumferentially and interiorly in the top portion of the receptacle.

6. An exchanger cell according to claim 1, with the addition of a baffle plate having perforations and adapted to float upon the liquid in which the exchanger bed is submerged, and also adapted to float upwardly due to said wash water rising through said receptacle.

7. An exchanger cell according to claim 1, with the addition of an annular baffle plate having perforations and surrounding the upper terminal portion of the feed conduit, which baffle plate is adapted to float upon the liquid in which the exchanger bed is submerged, and also adapted to float upwardly due to said wash water rising through said receptacle.

8. An exchanger cell according to claim 1, in which the receptacle has a top closure portion, with the addition of a cylindrical member supported from said top portion and extending therefrom downwardly into the vicinity of said valve means and substantially coaxially with said feed conduit.

9. An exchanger cell according to claim 1, in which the receptacle has a removable bottom portion, with the addition of constriction plate means for supporting the exchanger bed, said constriction plate means and said bottom portion forming between them a liquid collecting and distributing space, and spacing means provided on said bottom portion at points inwardly from the margin thereof and extending upwardly from said bottom portion to support said constriction plate.

10. An exchanger cell according to claim 1, in which the receptacle has a removable bottom portion provided with an opening, with the addition of constriction plate means for supporting the exchanger bed, said constriction plate means and said bottom portion forming between them a liquid collection and distributing space, spacing means provided on said bottom portion at points inwardly from the margin thereof and extending upwardly from said bottom portion to support the constriction plate, a spider structure of radially extending ribs provided interiorly of and at the lower end of the receptacle, said constriction plate means being confined between said spacing means and said radial ribs, said spider structure having a central hub portion presenting an interior conical seating face, said vertical feed conduit being provided with a conical portion adapted to engage said conical seating face, and means for holding in place and sealing said induction pipe with respect to said opening in the bottom portion.

11. An exchanger cell according to claim 1, in which the receptacle has a removable bottom portion provided with an opening, a spider structure of radially extending ribs provided interiorly of and at the lower end of the receptacle, constriction plate means for supporting and confined between said bottom portion and said spider structure, said spider structure having a central hub portion presenting an interior conical seating face, said vertical feed conduit being provided with a corresponding conical portion adapted to engage said conical seating face when the feed pipe is introduced from below through said hub portion, and of means for holding in place and sealing said vertical feed conduit with respect to said opening in the bottom portion.

12. An exchanger cell according to claim 1, in which the receptacle has a removable bottom portion formed with a central well portion and a bottom opening therein and also formed with liquid collecting channels extending radially from said well portion, a spider structure of radially extending ribs provided interiorly of and at the lower end of the receptacle, constriction plate means for supporting said bed and confined between said bottom portion and said spider structure, said spider structure having a central hub portion presenting an interior conical seating face, said vertical feed conduit being provided with a corresponding conical portion adapted to engage said conical seating face when the feed conduit is introduced from below through said hub portion, and means for holding in place and sealing said feed pipe with respect to said opening in the bottom portion.

13. An exchanger cell according to claim 1, in which the receptacle has a removable bottom portion provided with an opening, a spider structure of radially extending ribs provided interiorly of and at the lower end of the receptacle, constriction plate means for supporting said bed and confined between said bottom portion and said spider structure, said spider structure having a central hub portion adapted to have substantial sealing engagement with said vertical feed conduit when the same is introduced from below through said hub portion, and means for holding in place and sealing said feed pipe with respect to said opening in bottom portion.

14. An exchanger cell according to claim 1, in which the receptacle has a removable bottom portion provided with a central well portion having an opening in the bottom thereof, and also provided with distributing channels extending radially from said well portion, a spider structure of radially extending ribs provided interiorly of and at the lower end of the receptacle, constriction plate means for supporting said bed and confined between said bottom portion and said spider structure, said spider structure having a central hub portion adapted to have sealing engagement with said feed conduit when the same is introduced from below through said hub portion, and means for holding in place and sealing said feed conduit with respect to said opening.

15. An exchanger cell according to claim 1, in which the receptacle has a removable bottom portion provided with a central well portion having an opening in the bottom thereof, and also provided with distributing channels extending radially from said well portion, at least one cylindrical spacer baffle concentric with said well portion and provided on said bottom portion so as to traverse said channels, constriction plate means supported by said spacer baffle for supporting the bed, a spider structure of radially extending ribs provided interiorly of and at the lower end of the receptacle, said spider structure having a central hub portion adapted to have sealing engagement with said feed pipe when the same is introduced from below through said hub portion, and means for holding in place and sealing said feed conduit with respect to said aperture in the bottom portion.

16. A liquid treatment cell comprising a closed receptacle adapted to hold a bed of granular material, means for feeding liquid to said bed for passage downwardly therethrough, means for discharging liquid from said bed substantially at a rate at which it is fed, whereby the bed is adapted to be kept in submergence, and means for controlling the level of the liquid passing downwardly through the bed so as to maintain said level between an upper and a lower limit, comprising a source of an auxiliary gaseous pressure medium, pressure admitting means operable to admit a quantity of said pressure medium into said receptacle to displace liquid from the receptacle through said liquid discharge means to lower the liquid level when the same has unduly risen, and to shut off the admission of pressure medium to the receptacle when the level has been sufficiently lowered, and pressure releasing means operable to release a quantity of auxiliary pressure medium from said receptacle to allow the liquid level to rise when the same has unduly dropped, and to shut off the release when the level has been sufficiently raised.

17. A liquid treatment cell according to claim 16, with the addition of automatic means for controlling the liquid level, which means are responsive to changes of said liquid level, comprising a float-controlled device actuated by said liquid level, and actuating means effective between said device and the pressure admitting means for admitting said pressure medium to lower the liquid level, and for shutting off said pressure medium when the level has been sufficiently lowered, and comprising a second float-controlled device actuated by said liquid level, and actuating means effective between said second device and the pressure releasing means for releasing said pressure medium from the receptacle to raise the liquid level, as well as for shutting off the release when the level has been sufficiently raised.

18. A liquid treatment cell according to claim 16, with the addition of automatic means for controlling the liquid level, which means are responsive to changes of the level, comprising a photo-electric device actuated by a light beam adapted to be affected by said liquid with the rise and fall thereof, electric impulse means effective between said device and the pressure admitting means for admitting said pressure medium to lower the liquid level as well as for shutting off said pressure medium when the level has been sufficiently lowered, a second photo-electric device actuated by a light beam adapted to be affected by said liquid with the fall and rise thereof, electric impulse means effective between said last mentioned device and the pressure releasing means for releasing pressure medium from said receptacle to raise the liquid level as well as for shutting off the release when the level has been sufficiently raised.

19. In the treatment of sugar bearing liquids the method of operating an exchanger bed contained in a closed tank having substantial freeboard space above the bed, which comprises passing the liquid downwardly through the bed against a flow resistance, and maintaining the bed substantially submerged by controlling the pressure of a gaseous medium above the bed and said flow resistance relative to one another in a manner to maintain the liquid level substantially at the top strata of the bed.

20. The method according to claim 19, in which said liquid level is controlled by admitting additional gaseous medium to, or releasing a portion of the confined medium from said tank.

RALPH W. SHAFOR.